Sept. 15, 1953
H. B. MANLEY
2,652,238
BUBBLE TRAY WATER DECANTER
Filed June 10, 1950
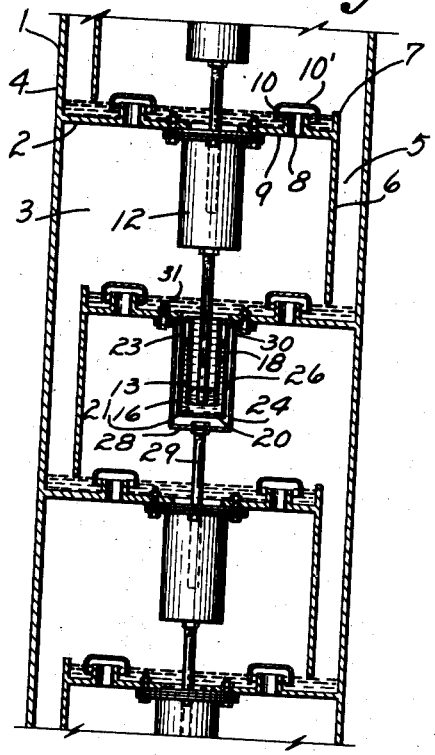
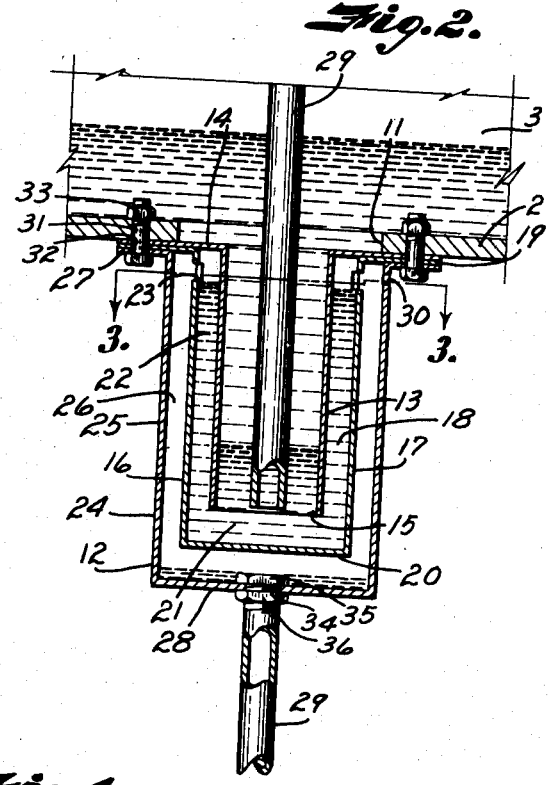
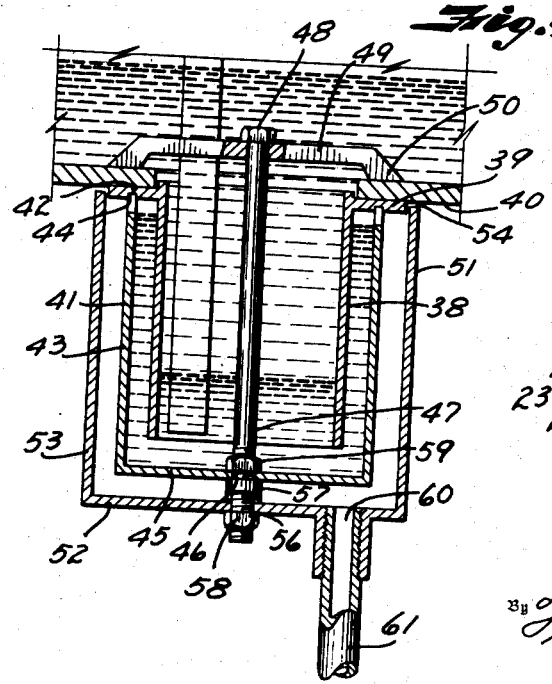
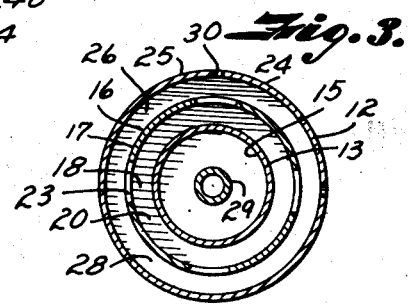
Inventor
Humes B. Manley
By Fishburn & Mullendore
Attorneys Patented Sept. 15, 1953

2,652,238

UNITED STATES PATENT OFFICE 2,652,238

BUBBLE TRAY WATER DECANTER

Humes B. Manley, Powell, Wyo.

Application June 10, 1950, Serial No. 167,431

4 Claims. (Cl. 261—114)

1

This invention relates to liquid separators for liquid and gas contacting stages such as bubble trays of stills, fractionating towers and like apparatus, wherein separation of water from the liquid contact medium is a problem.

The principal object of the invention is to provide for continuous operation and draw off from the contact stages or trays of a heavier liquid such as water from a lighter liquid such as oil, the oil being left in the trays for contact with the gas.

Other objects of the invention are to provide the trays of a tower of the character described with separators that are of simple and inexpensive construction, easy to install and which may be readily taken apart and removed for cleaning.

In accomplishing these and other objects of the invention hereinafter pointed out I have provided improved structure, the preferred forms of which are illustrated in the accompanying drawings, wherein:

Fig. 1 is a vertical section through a portion of a bubble tray type of fractionator equipped with liquid separators embodying the features of the present invention, one of the separators being shown in vertical section.

Fig. 2 is an enlarged vertical section through one of the separators to better illustrate the passages therein.

Fig. 3 is a horizontal section on a line 3—3 of Fig. 2.

Fig. 4 is a vertical section through a modified form of separator.

Referring more in detail to the drawings:

1 designates a fractionating tower having a series of gas and liquid contact stages including superimposed trays 2 that extend transversely in the tower at vertically spaced levels to provide gas or vapor spaces 3 therebetween. The trays 2 join with the wall 4 of the tower and are provided with down flumes 5 that extend from one tray to the other for the progressive down flow of a liquid such as oil, that collects in the respective trays. The wall 6 forming the flumes extends upwardly from the bottom of the trays a suitable distance to provide weirs 7 for collecting and maintaining definite bodies of liquids in the respective trays and form overflows into the down flumes and the lower ends of the partitions form liquid seals with the liquids contained in the next lower tray.

Each tray has a plurality of openings 8, in the bottoms 9 thereof, that connect the adjacent gas spaces on the respective sides of the trays and which are formed by upstanding collars 10 of a height to maintain the bodies of liquids in the respective trays and to co-operate with cap 10' for effecting liquid seals between the respective gas spaces 3 so that the gas traveling from one space to another bubbles through the liquid.

The structure thus far described is conventional in fractionating and like towers which are in common use. Such towers operate satisfactorily, however, water is sometimes experienced in connection with the oil that collects within the trays and it is a problem to drain the water off and discharge the water independently of the oil, particularly since it is difficult to establish those trays where a water draw off should be located for satisfactory operation.

These difficulties are overcome by the present invention through provision of each bubble tray, where a liquid to be separated is likely to collect, with a liquid separator as now to be described.

In carrying out the present invention, each of the trays where the heavy liquid is likely to collect is provided with an opening 11 in the bottom thereof for connection with a separator unit 12. Each separator unit 12 includes a tubular down flume or duct 13 having an annular flange 14 at its upper end engaging the bottom of the tray. The lower end of the flume being open as at 15 to allow gravity flow of fluid into a receptacle 16 also forming a part of a separator unit. The separator 16 includes an annular wall 17 of larger diameter than the flume to provide an annular up flow passageway 18 therearound. The upper end of the wall 17 has outwardly extending annular flange 19 that seats against the under side of the flange 14 as best shown in Fig. 2. The wall 17 is of longer length than the flume and carries a closed bottom 20. The receptacle 16 thus co-operates with the flume to provide a connecting passageway 21 between the flume and the up flow passageway 18 for flow of the heavier liquid and provide hydrostatic head of the heavier liquid as indicated at 22 Fig. 2 to counterbalance the hydrostatic head of separated liquids contained in the flume 13.

Formed in the side wall 17 of the receptacle are outlets 23 for overflow of the heavier liquid into an outer or collecting receptacle 24. The receptacle 24 also includes an annular wall 25 which is of larger diameter than the wall 17 to provide a down flume passageway 26 in connection with the outlets 23. The upper edge of the wall is provided with an annular flange 27 that seats upon the flange 19 and the lower end of the wall carries a closed bottom 28 to which a drain duct 29 is connected. Pressure is equalized between the gas space in which the separator is connected and the passageway 26 through ports 30 that are formed in the walls 25 adjacent the liquid outlets 23.

The inner and outer receptacles are secured to the tray bottom by fastening devices such as bolts 31 that extend through registering openings 32 in the respective flanges 14, 19, and 27 and registering openings 33 in the tray as shown in Fig. 2. The drain duct 29 is secured within an opening 34 in the bottom 28, for example, by nuts 35 and 36 that are threaded on to the end of the pipe and engage the respective sides of the bottom 28. The drain duct 29 is of sufficient length to extend substantially to the bottom of the next lower flume so as to carry the heavier liquid that is separated in the upper separator into the separated liquid of the next lower separator as best shown in Fig. 1.

In operation the liquid is delivered to an upper portion of the tower and gravitates downwardly when the levels in the respective trays rise above the weirs 7 for flow through the flumes 5 to the succeeding trays. The contacting gas is delivered to a lower portion of the separator and moves upwardly through the openings 8 and bubbles through the liquid under the caps 10 of the bubble trays to make contact with the liquid carried in the respective trays 2.

Should the liquid contain a heavier component, such as water, the heavier component collects on the bottom of the tray and gravitates downwardly through the flumes 13 and upwardly in the passageways 18 until a hydrostatic head of water or heavy liquid balances the hydrostatic head of the liquid in the flumes 13. Since the contacting liquid is of lighter weight, it collects in a body above the outlet of the flumes 13 and is trapped in the respective trays until the level rises sufficiently to overflow the weirs 7.

As the heavier liquid tends to accumulate, it flows downwardly through the flume 13 and is displaced upwardly through the passageways 18 for discharge through the outlets 23 where it is collected within the outer receptacles and discharged through the ducts 29 to the next lower separator. It is to be understood that only those trays where the heavier liquid might accumulate may be provided with a separator as described, however, each tray may be provided with a separator without loss of the contacting liquid since the heavier liquid separated in an upper tray is delivered to a separator of the next lower tray to maintain a seal therein of the heavier liquid.

The form of the invention illustrated in Fig. 4 operates in the same manner as that illustrated in Figs. 1 to 3 inclusive, however the structure and method of mounting the separator is somewhat different. In this instance the flume or duct 38 has an annular flange 39 as retained in clamping contact with the tray bottom 40 by means including the inner receptacle 41 which has the upper edge 42 of the wall 43 thereof seating within a groove 44 that is formed in the under side of the flange 39. The bottom 45 of the receptacle 41 has an opening 46 which passes a rod 47 having a headed upper end 48 that is carried by a spider 49 which bridges the outlet opening of the tray and has foot portions 50 bearing upon the upper side of the tray bottom. The outer receptacle 51 includes a bottom 52 and an outer annular wall 53 that is retained in spaced relation with the under side of the tray to provide a pressure equalizing passage 54 therearound. The bottom 52 of the outer receptacle also has an opening 56 for passing the lower end of the rod 47 and is retained in spaced relation with the bottom 45 for maintaining a pressure equalizing passageway 54 by a sleeve 57 that is sleeved on the rod 47 intermediate the respective bottoms 45 and 52. The bottoms are clamped against the ends of the sleeve 57 and the edge 42 of the inner receptacle 41 is drawn into sealing contact with the annular groove of the flume flange by nuts 58 and 59 respectively engaging under the bottom 52 and against the upper face of the bottom 49. The bottom 52 has an outlet 60 into which the drain duct 61 is connected. It is apparent that this form of the invention is more readily installed in existing types of contacting towers.

From the foregoing, it is obvious that I have provided a separator for a liquid and gas contactor that is adapted for continuous operation and draw off of a heavier liquid such as water from the lighter contacting liquid. It is also obvious that I have provided a separator that is of simple construction and which is easily installed. It is also obvious that the body of contact liquid is retained in the tray by hydrostatic balance of the heavier liquid and that the heavier liquid is drawn off so that the gas does not make contact therewith.

What I claim and desire to secure by Letters Patent is:

1. In an apparatus of the character described including a bubble tray having an opening in said tray, a flume depending within said opening, and having an annular flange seated against the bottom of said tray, a receptacle surrounding the flume and having seating contact with said flange, a spider bridging said opening on the upper side of said tray, a rod connecting the spider with said receptacle for retaining the flume and receptacle in position with respect to said tray, said receptacle having outlets adjacent said flange, a collecting receptacle surrounding the first named receptacle for receiving overflow through said outlets, and means supporting the last named receptacle by said rod.

2. In an apparatus of the character described including a bubble tray having an opening in said tray, a flume depending within said opening, and having an annular flange seated against the bottom of said tray, a receptacle surrounding the flume and having seating contact with said flange, a spider bridging said opening on the upper side of said tray, a rod connecting the spider with said receptacle for retaining the flume and receptacle in position with respect to said tray, said receptacle having outlets adjacent said flange, a collecting receptacle surrounding the first named receptacle for receiving overflow through said outlets, means supporting the last named receptacle by said rod including means for supporting the said receptacle in spaced relation with the tray bottom, and an outlet duct connected with the last named receptacle.

3. In a gas and liquid contact apparatus including a vessel having a bubble tray for collecting a body of contact liquid and having gas space above and below said tray, said tray having a gas passageway opening through the bottom of the tray at one end and through the body of liquid at the other end for effecting contact with a gas flow between said gas spaces with the liquid in said tray, an overflow duct connected with the tray for discharge of excess contact liquid, said tray having an outlet opening in the bottom thereof, and a liquid separator connected with said outlet opening and disposed entirely below the bottom of the tray wherethrough heavy liquid flows from the tray while the light contact liquid is retained in said tray for contact with the gas and for overflow from the tray through the overflow duct, said separator including a receptacle connected with and depending from the bottom of the tray in registry with said opening to collect the heavier component of the liquid in a body below the level of the gas passageway which opens through the tray bottom, a duct extending from the opening of the tray bottom into the receptacle and spaced inwardly from walls of the receptacle to form a liquid seal and an upward annular passageway between the duct and receptacle to contain a head of the heavier liquid sufficient to balance the head of lighter liquid in the tray and maintain the interface between said lighter and heavier liquids within said duct, said receptacle having an outlet for the heavier liquid, and a means surrounding the outlet for conducting excess of the heavier liquid through the gas space below the tray.

4. In a gas and liquid contact apparatus including a vessel having a bubble tray for collecting a body of contact liquid and having gas space above and below said tray, said tray having a gas passageway opening through the bottom of the tray at one end and through the body of liquid at the other end for effecting contact with a gas flow between said gas spaces with the liquid in said trays, an overflow duct connected with each tray for discharge of excess contact liquid from an upper tray to a lower tray, said trays having an outlet opening in the bottoms thereof, and liquid separators connected with said outlet openings and disposed entirely below bottoms of the trays wherethrough heavy liquid flows from an upper tray to the separator for a next lower tray while the light contact liquid is retained in said trays for contact with the gas and for overflow from the respective trays through the overflow ducts, said separators including receptacles connected with and depending from the bottoms of the respective trays in registry with said openings to collect the heavier component of the liquid in a body below the level of the gas passageways which open through said tray bottoms, ducts extending from the openings of the tray bottoms into the receptacles and spaced inwardly from walls of the receptacles to form liquid seals and upward annular passageways between the ducts and receptacles to contain heads of the heavier liquid sufficient to balance the head of lighter liquid in said trays and maintain the interface between said lighter and heavier liquids within said ducts, said receptacles having outlets for the heavier liquid, and a means surrounding the outlets and having a depending duct extending to the receptacle of the next lower separator for conducting excess of the heavier liquid from the receptacles through the gas spaces between the respective trays.

HUMES B. MANLEY.

References Cited in the file of this patent

UNITED STATES PATENTS

| Number | Name | Date |
|---|---|---|
| 1,624,793 | Mann et al. | Apr. 12, 1927 |
| 1,862,758 | Merley | June 14, 1932 |
| 1,865,818 | Berryman | July 5, 1932 |
| 1,899,409 | Bottoms | Feb. 28, 1933 |
| 1,986,431 | Gray | Jan. 1, 1935 |
| 2,055,048 | Puls | Sept. 22, 1936 |
| 2,084,726 | Duey | June 22, 1937 |
| 2,191,919 | Thayer | Feb. 27, 1940 |
| 2,416,724 | Whaley | Mar. 4, 1947 |
| 2,495,512 | Dorfan | Jan. 24, 1950 |
| 2,501,114 | Whaley | Mar. 21, 1950 |